W. W. Wade,
Furniture Caster.
Nº 9,733.        Patented May 17, 1853.
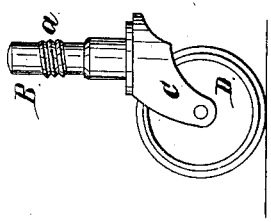
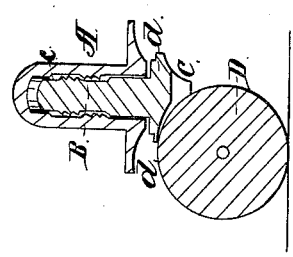
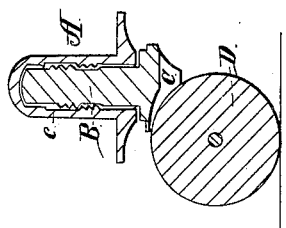
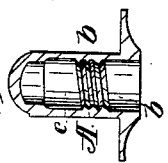
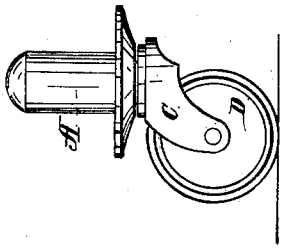

UNITED STATES PATENT OFFICE.

W. W. WADE, OF SPRINGFIELD, MASSACHUSETTS.

CASTER FOR FURNITURE.

Specification of Letters Patent No. 9,733, dated May 17, 1853.

*To all whom it may concern:*

Be it known that I, WILLIAM WHEATON WADE, of Springfield, in the county of Hampden and State of Massachusetts, have invented a new and useful Improvement in Casters for Furniture; and I do hereby declare that the same is fully described and represented in the following specification and the accompanying drawings, letters, figures, and references thereof.

Of the said drawings Figure 1 denotes a side view of my improved caster. Fig. 2 is a central and vertical section, Fig. 3 a side view of the roller frame and shank as they appear when removed from the socket. Fig. 4 is a vertical section of the socket.

In the drawings A represents the metallic socket piece, B the shank, C the wheel frame attached to the shank, D the wheel.

The improvement I have made is to be found in the shank B and the socket A and to accomplish the same I make on the shank B and to project from it a male screw $a$ for a short distance and at about the middle part of the shank.

Within the socket A and below where the screw $a$ would be when the shank is entirely in the socket or so that its upper end bears against the socket, I make a female screw $b$ to fit the said male screw. It will thus be seen that the distance of the lower part of the male screw from the head or upper end of the spindle or shank B is to be a little greater than that of the female screw $b$ from the upper part of the internal bore of the socket piece A. Above the screw $b$ and in the socket A I make a chamber $c$ for the reception of the screw $a$, which chamber is to have a diameter equal to or greater than the maximum diameter of the screw $a$. The remainder of the shank and socket may be formed as represented in the drawings or in any other suitable manner.

From the above it will be seen that when the shank B is inserted in the socket piece A and rotated until the screw $a$ passes into and entirely beyond the screw $b$ the socket B may not only be turned around freely without further advancement, but will be held in place by the two screws $a$, $b$ and prevented from falling out of the socket. Consequently while the whole of the screw $a$ is within the chamber $c$ and entirely above the screw $b$, and the spindle or shank B rests or bears against the head of the socket the shank B is free to rotate in horizontal directions and is held in place so that if the table or article of furniture to which the caster is applied is raised upward so as to lift the caster from the floor the spindle of such caster will not drop out of the socket.

The above mode of constructing a caster affords a ready means of detaching the spindle and roller from the socket piece whenever the same may be necessary, and as such is often desirable particularly at or previous to removal or transportation of it or while the same is on sale, my improvement renders the caster very convenient in such respects.

I would take occasion to remark that the bearing surfaces of the spindle and socket instead of being at the upper parts of the same or above the screws may be arranged below the screws, as for instance the socket may rest on or against a shoulder $d$, $d$, made on the spindle, in which case the arrangement of the screws with respect to one another and the bearings would be essentially as represented in Fig. 5, there being in the same no difference in the principle of my invention.

What therefore I claim as my invention is—

The arrangement of the male screw $a$ on the spindle B in combination with or respect to the arrangement of the female screw $b$ in the socket of the socket piece A and to the bearing surfaces of the said parts A and B substantially as specified or represented, whereby the spindle is not only preserved in the socket piece by the two screws, but allowed freely to rotate when its bearing surface is in contact with the bearing surface of the socket as described.

In testimony whereof I have hereto set my signature this tenth day of November A. D. 1852.

WILLIAM WHEATON WADE.

Witnesses:
 HENRY MORRIS,
 AARON W. ALLEN.